: 3,230,930
Patented Jan. 25, 1966

3,230,930
METHOD OF INDUCING MOULT OF SILKWORMS
Yasuji Hamamura, Keizo Hayashiya, and Minoru Goto, Kyoto, and Masaki Kamada, Osaka, Japan, assignors, by mesne assignments, of one-half to Takeda Chemical Industries, Ltd., Osaka, Japan, and of one-half to Yasuji Hamamura
No Drawing. Original application Feb. 6, 1964, Ser. No. 343,106. Divided and this application Mar. 9, 1965, Ser. No. 438,415
Claims priority, application Japan, Feb. 13, 1963, 38/7,752
2 Claims. (Cl. 119—6)

The present application is a division of copending application, Serial No. 343,106, filed February 6, 1964.

The present invention relates to including moult of silkworms, and more especially relates to a method of inducing moult of silkworms when breeding the latter, by administering to the silkworms an artificial diet containing at least one of the following choline derivatives:

Choline chloride,
Acetylcholine chloride,
Choline phosphochloride,
Lecithin,
Benzoylcholine chloride, or
A mixture of these derivatives, in an amount of not less than 500 gamma of dried artificial diet.

While silkworms are known to be monophargous in eating nothing but mulberry leaves, no exact reason for it has been made clear. Dr. Hamamura, one of the inventors of this invention, found out that in mulberry leaves there are contained such factors as the attracting factor which attracts silkworms (terpenes such as citral, linalyl acetate, linalol, terpinyl acetate), the biting factor which stimulates silkworms to bite ($\beta$-sitosterol with or without flavonoids such as quercetin, morin, rutin, isoquercitrin), the swallowing factor which stimulates them to bite and swallow continuously (cellulose powder), and sugar such as sucrose, fructose, glucose and inorganic phosphate such as potassium dihydrogen phosphate, dipotassium hydrogen phosphate, sodium dihydrogen phosphate, disodium hydrogen phosphate, calcium phosphate, and these are indispensable for the feed of silkworms. Conditions of the foodstuff, e.g. taste and nutritional value, are inferred strictly to be of merely secondary significance in inducing silkworms to the action of eating, though they should certainly be considered in connection with the insectal growth.

The present inventors have extensively studied on the feeding of silkworms so as to rear silkworms with artificial diet without any addition of mulberry leaves, and found out that when newly hatched silkworms are reared with diet prepared by replacing defatted soybean powder in the basal artificial diet employed in Example 1 shown later with pure soybean protein, molting is suppressed and no larva reaches the 2nd instar. Accordingly the present inventors have named the substance which is contained in defatted soybean powder but not in pure soybean protein as the growth-promoting factor. Further continuous study has made it clear that the growth-promoting factor is choline or its derivaties. Namely, it has been found out by the present inventors that choline or its derivatives have a distinguishable action on inducing moult of silkworms. In the present specification, "choline" means choline salts. As choline salts, choline halides are most conveniently put to use. Among the choline derivatives, there may, for example, be enumerated acetylcholine halide, lecithin, benzoylcholine halide, and choline phosphohalide. As the halides, most preferable are chlorides.

The first object of this invention is to breed silkworms with an artificial diet. The second object is to promote the growth of silkworms. The first object is realized by preparing foodstuff containing choline or its derivatives. The second and third objects are realized by giving silkworms foodstuff containing choline or its derivatives.

The growth-promoting factor of this invention shows especially strong effect when given at a period from larvae to the 2nd instar.

For a practical application choline derivatives may preferably be utilized together with the afore-mentioned attracting factor, biting factor and swallowing factor, i.e. terpenes, $\beta$-sitosterol with or without flavonoids and cellulose powder, though terpenes may be omitted when silkworms are put on the feed, and sugar, inorganic phosphate, inorganic silicate, inositol, etc. by mixing various components necessary for the growth of silkworms, in a powdery, jelly or paste form. As the components which are necessary for the growth of silkworms, there may, for example, be agar-agar, sodium carboxymethyl cellulose, methylcellulose, alginic acid, soybean powder, parched bean flour, defatted soybean powder, bean curd, dried fermented soybean powder, defatted and dried bean paste; cereal flour such as rice flour, barley flour, wheat flour, or their processed matter; yeast or its processed matter such as dry yeast, yeast extract, extracted fluid of yeast, extracted cake of yeast; straw ashes; fish meal;

Animal or plant protein;

Amino acid such as glutamic acid, aspartic acid, leucine, lysine, tyrosine, tryptophane, valine, serine, proline, glycine, alanine, isoleucine, phenylalanine, arginine, methionine, threonine or their salts;

Vitamins such as pantothenic acid, nicotinic acid, vitamin $B_1$, vitamin $B_2$, vitamin $B_6$, vitamin $B_{12}$, vitamin C, vitamin D, biotin, folic acid, vitamin K, vitamin E, vitamin P, inositol, orotic acid, lipoic acid;

Inorganic salts such as calcium carbonate, sodium carbonate, sodium hydrogen carbonate, sodium chloride;

Honey collected from beehive or its processed matter;

Pectin;

Enzyme such as diastase, papain, trypsin;

Preservative such as formalin, sodium dehydroacetate, vitamin $K_3$, sodium sorbate;

Antibiotic such as tetracycline, chlortetracycline, oxytetracycline, streptomycin, dihydrostreptomycin, neomycin, kanamycin, picromycin, leucomycin, erythromycin, oleandomycin, trichomycin, chloramphenicol, penicillin;

Sulfa drug such as sulfaisomidine, sulfaisoxazole, methoxypyridazine;

Furan derivatives such as nitrofuran; and

Glucuronic acid or its salt such as sodium salt, potassium salt, calcium salt, ammonium salt, organic amine salt, glucuronic acid ethyl ester, glucuronic acid amide, 2-amino-2-desoxy-D-glucuronic acid or its salt, N-glucuronosylglucosamine or its salt.

The quantities of choline derivatives necessary for inducing moult of silkworms may be varied depending on various conditions such as instar or the state of the silkworms and the kind or quantity of the other components composing the artificial diet. Generally, it is necessary to employ not less than 500 gamma per one gram of the dried artificial diet. Generally an amount of choline derivatives over 500 gamma per 1 gram gives the same result as in 500 gamma/one gram.

| Morin, milligrams | 25 |
| Inositol, milligrams | 50 |
| $K_2HPO_4$, milligrams | 50 |
| $SiO_2$, milligrams | 250 |
| Water, cubic centimeters | 15 |

*Table 2.—Diet*

I.—Basal artificial diet shown in Table 1.
II.—Diet whose components are corresponding to those wherein defatted soybean powder in the basal artificial diet is replaced with pure soybean protein.
III.—Basal artificial diet+acetylcholine chloride, 5 milligrams.
IV.—Diet II+acetylcholine chloride, 5 milligrams.

*Table 3.—Results*

| Diet Feed | Number of larvae of silkworms employed for the test | Number of silkworms reached the 2nd instar | | | | | Number of silkworms which survive up to the 2nd instar | Weight of each silkworm of the 2nd instar (milligrams) |
|---|---|---|---|---|---|---|---|---|
| | | 6 days | 7 days | 8 days | 9 days | 10 days | | |
| I | 20 | 2 | 2 | 6 | 7 | | 17 | 4.5 |
| II | 20 | | | | | | 0 | |
| III | 20 | 11 | 6 | | | | 17 | 5.8 |
| IV | 20 | | | 9 | 6 | | 15 | 4.5 |

The following experiments are given to show the efficacy for inducing moult of silkworms by choline derivatives.

EXPERIMENT 1

Larvae of silkworms are reared with the basal artificial diet I, whose components are shown in Table 1. And diets II, III and IV are prepared by changing components of the basal artificial diet. When larvae of silkworms are reared with the basal artificial diet, they can reach the 2nd instar. While, when larvae of silkworms are reared with the diet II which is prepared by replacing defatted soybean powder in the basal artificial diet with pure soybean protein, molting is suppressed and no larva reaches the 2nd instar. Further, when larvae of silkworms are reared with the diet III or IV which is prepared by adding acetylcholine respectively to the basal artificial diet and to the diet II, larvae can molt to be the 2nd instar, and time required for silkworms to reach the 2nd instar is shortened.

*Table 1.—The components of basal artificial diet*

| Cellulose powder, grams | 5.0 |
| Defatted soybean powder, grams | 2.0 |
| Starch, grams | 1.5 |
| Sugar, gram | 1.0 |
| Wesson's minerals, gram | 0.090 |
| Vitamins: | |
|    Vitamin C, gram | 0.04 |
|    Vitamin $B_1$, milligram | 0.01 |
|    Vitamin $B_2$, milligram | 0.01 |
|    Vitamin $B_6$, milligram | 0.01 |
|    Nicotinic acid, milligram | 0.02 |
|    Pantothenic acid (calcium salt), milligram | 0.02 |
|    Folic acid, milligram | 0.002 |
|    Biotin, milligram | 0.002 |
|    Vitamin $B_t$, milligram | 0.01 |
| $\beta$-Sitosterol, milligrams | 50 |

EXPERIMENT 2

Experiment is carried out in the same way as in Experiment 1 by employing diet V and VI shown in Table 4.

*Table 4.—Diet*

Diet V.—Basal artificial diet+dihydrostreptomycin, 10 milligrams.
Diet VI.—Diet V+acetylcholine chloride, 5 milligrams.

*Table 5.—Results*

| Diet | Number of larvae of silkworms employed for the test | Number of silkworms reached the 2nd instar | | | | Number of silkworms which survived up to the 2nd instar | Weight of each silkworm of the 2nd instar (milligrams) |
|---|---|---|---|---|---|---|---|
| | | 6 days | 7 days | 8 days | 9 days | | |
| I | 20 | 2 | 2 | 6 | 2 | 12 | 4.5 |
| V | 20 | | 5 | 7 | | 12 | 5.4 |
| VI | 20 | 10 | 7 | | | 17 | 5.4 |

The following example is given for the purpose of illustrating embodiments of this invention, it being understood that modifications and variations of the compositions described in the specification and claims are included in the scope of this invention.

EXAMPLE

Foodstuff for silkworms containing 2.5 parts by weight of cellulose powder, 1.5 parts by weight of defatted soybean protein, 2.0 parts by weight of frozen mulberry leaves powder, 0.5 part by weight of yeast, 1.5 parts by weight of starch, 1.0 part by weight of sugar, 0.015 part by weight of dihydrostreptomycin, 0.005 part by weight of acetylcholine chloride, and a small amount of $\beta$-sitosterol, Wesson's minerals, morin, inositol, $K_2HPO_4$, and $SiO_2$ and 15 parts by volume of water.

Having thus disclosed this invention, what is claimed is:

1. A method for inducing moult of silkworms in breeding with an artificial diet, which comprises feeding silkworms, in a moulting stage thereof, a member selected from the group consisting of choline chloride, acetylcholine chloride, choline phosphochloride, lecithin, benzoylcholine chloride and a mixture thereof, in an amount of not less than 500 $\gamma$/g. of dried artificial diet.

2. A method for inducing moult of silkworms in breeding with an artificial diet, which comprises feeding silkworms, in a moulting stage thereof, acetylcholine chloride in an amount of not less than 500 gamma per one gram of dried artificial diet.

References Cited by the Examiner

UNITED STATES PATENTS 1,990,343  2/1935  Naruse _____ 99—2

OTHER REFERENCES

Rose et al.: Condensed Chemical Dictionary, 5th ed., page 11 (1956).

Hamamura et al.: Food Selection by Silkworm Larvae, "Nature," vol. 194, May 1962, pp. 754–755.

Merck and Co., Inc., Merck Index, 7th edition (1960), paper 253.

Fukuda et al.: Synthetic Diet for Silkworm Raising, "Nature," vol. 196, October 1962, pp. 53–54.

SAMUEL KOREN, *Primary Examiner.*

ALDRICH F. MEDBERY, *Examiner.*